(12) United States Patent
Gersten

(10) Patent No.: US 9,671,010 B2
(45) Date of Patent: Jun. 6, 2017

(54) HYBRID DRIVELINE FOR A MOTOR VEHICLE

(71) Applicant: ZF Friedrichshafen AG, Friedrichshafen (DE)

(72) Inventor: Rayk Gersten, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/886,411

(22) Filed: Oct. 19, 2015

(65) Prior Publication Data

US 2016/0116054 A1    Apr. 28, 2016

(30) Foreign Application Priority Data

Oct. 24, 2014    (DE) .......................... 10 2014 221 667

(51) Int. Cl.
 *F16H 57/04*    (2010.01)
 *B60K 6/40*    (2007.10)

(52) U.S. Cl.
 CPC ........... *F16H 57/0476* (2013.01); *B60K 6/40* (2013.01); *Y10S 903/951* (2013.01)

(58) Field of Classification Search
 CPC ....... F16H 57/0476; B60K 6/40; B60K 6/405; H02K 9/19; H02K 9/192; H02K 9/197; Y10S 903/951
 See application file for complete search history.

(56) References Cited

U.S. PATENT DOCUMENTS

| | | | |
|---|---|---|---|
| 7,919,890 B2 * | 4/2011 | Taketsuna | H02K 9/19 310/254.1 |
| 8,456,045 B2 * | 6/2013 | Hayashi | F16H 57/0412 310/113 |
| 8,502,424 B2 | 8/2013 | Esse | |
| 9,266,423 B2 * | 2/2016 | Hoshinoya | H02K 7/006 |
| 2009/0179509 A1 * | 7/2009 | Gerundt | F16H 57/0413 310/54 |

(Continued)

FOREIGN PATENT DOCUMENTS

| DE | 10 2008 001 618 A1 | 11/2009 |
|---|---|---|
| DE | 10 2008 001 622 A1 | 11/2009 |

(Continued)

OTHER PUBLICATIONS

German Search Report Corresponding to 10 2014 221 667.2 mailed Jul. 9, 2015.

*Primary Examiner* — Brian Swenson
(74) *Attorney, Agent, or Firm* — Davis & Bujold, PLLC; Michael J. Bujold

(57) ABSTRACT

A hybrid drive assembly for a motor vehicle, with a main transmission (4) and an electric machine (10) arranged in a hybrid module (6). The electric machine has a rotor (14) that rotates within a rotational space (38). The hybrid module (6) and the main transmission (4) share a common oil system, whose oil temperature is measured. A device (62, 64) is provided which, if a limit value of the oil temperature is exceeded, controls the oil level (58) in the oil sump in the rotation space (38) of the electric machine (10) in such a manner that the rotor (14) becomes immersed in the oil, within the oil sump (58), and can take up oil and throw the oil off again off onto components of the electric machine (10) located within the rotational space.

11 Claims, 3 Drawing Sheets

(56) References Cited

U.S. PATENT DOCUMENTS

2011/0017015 A1\* 1/2011 Cimatti ................... B60K 6/48
  74/665 R
2013/0169073 A1\* 7/2013 Nagahama ............... H02K 9/19
  310/43
2014/0041619 A1\* 2/2014 Yamauchi ............ B60K 7/0007
  123/196 R

FOREIGN PATENT DOCUMENTS

| DE | 10 2013 211 225 A1 | 12/2014 |
|----|---|---|
| DE | 10 2014 209 056 A1 | 4/2016 |
| JP | 2003-169448 A | 6/2003 |
| JP | 2008-263757 A | 10/2008 |
| JP | 2008-286247 A | 11/2008 |

\* cited by examiner

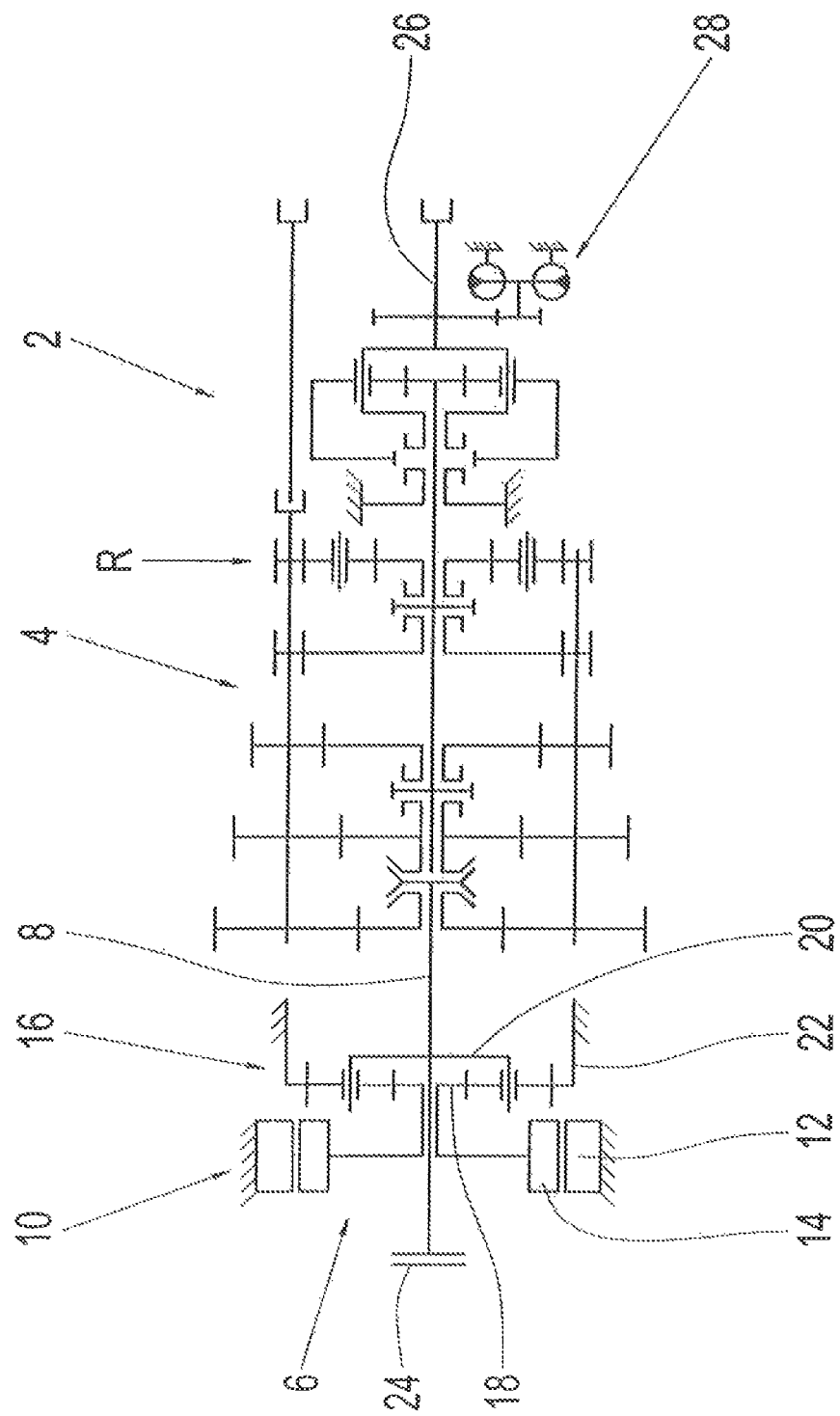
PRIOR ART  Fig. 1

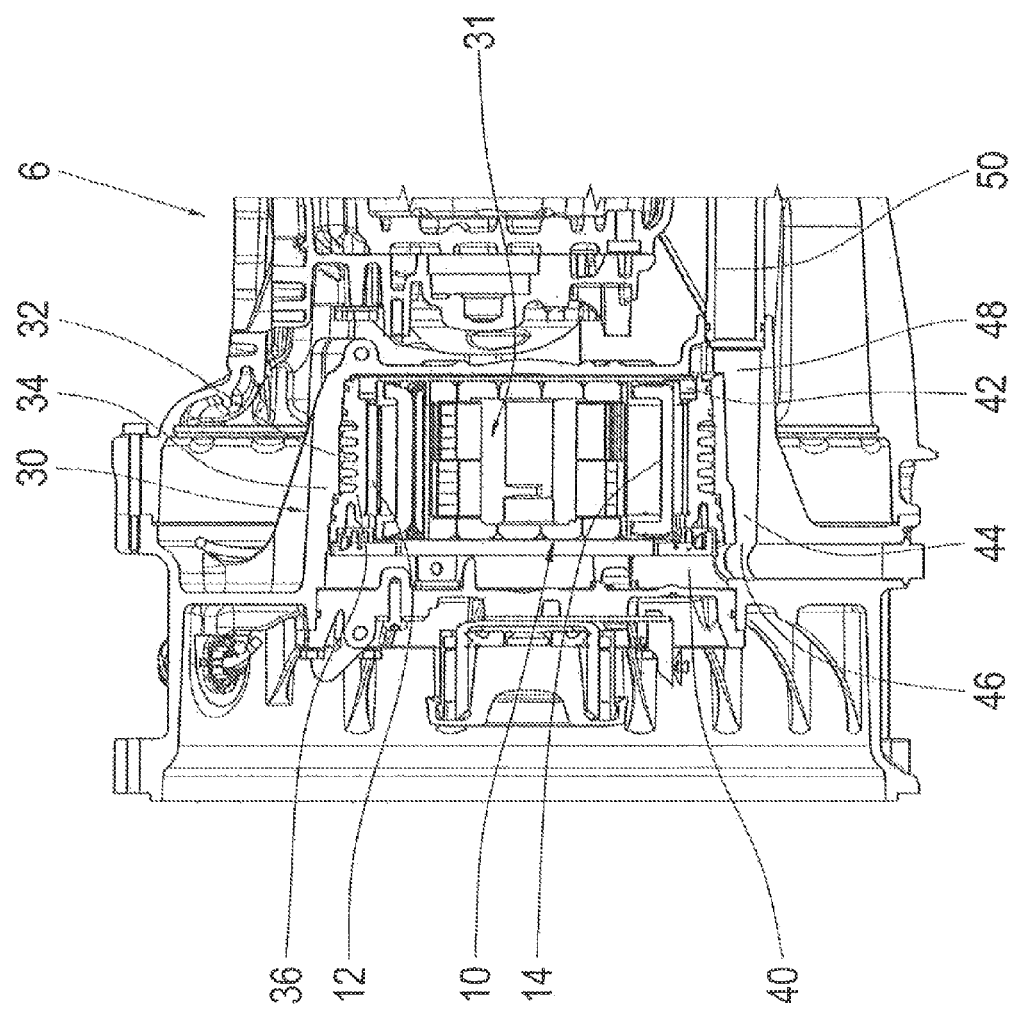

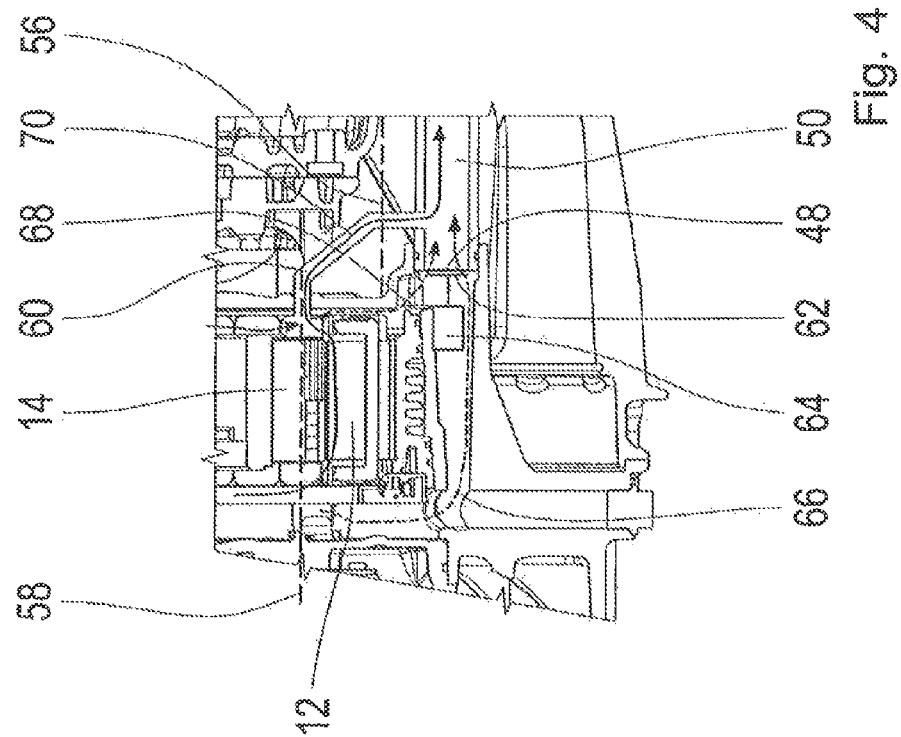
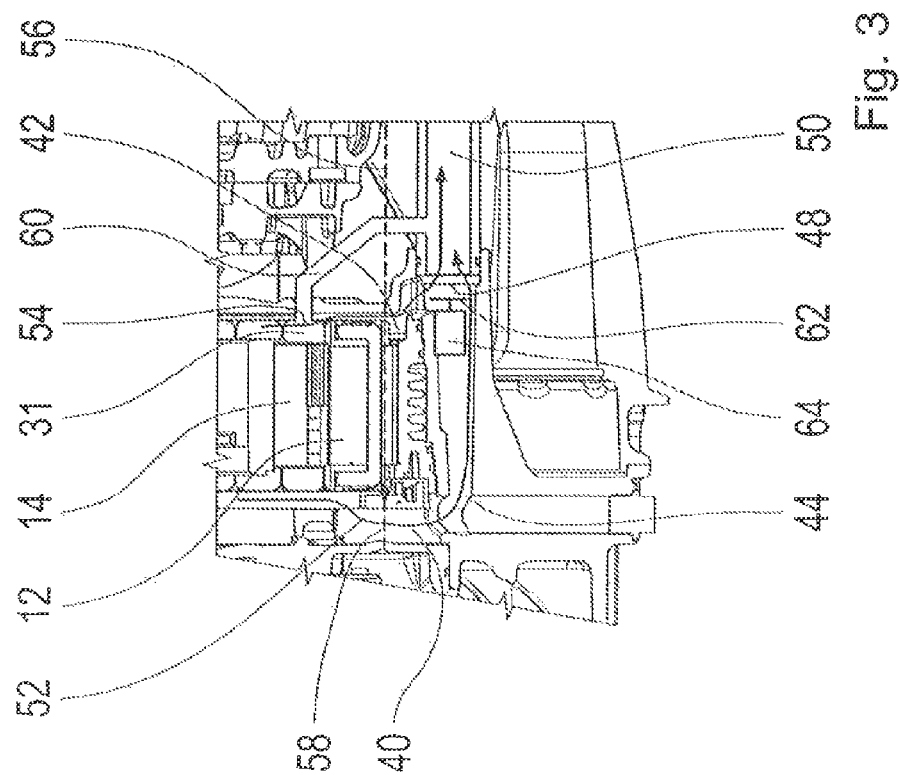

HYBRID DRIVELINE FOR A MOTOR VEHICLE

This application claims priority from German patent application serial no. 10 2014 221 667.2 filed Oct. 24, 2014.

FIELD OF THE INVENTION

The invention concerns a hybrid drive assembly for a motor vehicle.

BACKGROUND OF THE INVENTION

Electric machines in parallel hybrid drive-trains of motor vehicles can be decoupled from direct restriction to the rotational speed range of the internal combustion engine by the use of an additional step-up or step-down stage, a so-termed high-drive stage, which provides a functional drive arrangement between the driveshaft of an internal combustion engine and the input shaft of a vehicle transmission. Such a high-drive stage enables the use of electric machines with high rotational speeds having a high mass-power density, as can be realized for example in permanently energized synchronous machines. In this way the increasing demand for expensive materials such as rare earth metals and copper, which are needed for the production of modern electric motors, can be reduced, thereby conserving raw material resources and saving manufacturing costs. In addition the installation space and the weight of the electric machine can be reduced. The lower torque of a smaller electric machine can be compensated by a higher rotational speed compared with a rotational speed of a drive input shaft of the vehicle's transmission. The adaptation of the higher rotational speeds of electric machines to a required transmission input rotational speed is effected by virtue of a transmission ratio of the high-drive stage.

From DE 10 2013 211 225 A1 by the present applicant a hybrid drive assembly for a motor vehicle with an electric machine is known, which is in driving connection, by way of a high-drive stage, with a transmission of the vehicle. The vehicle transmission is an automated shift transmission comprising, on the input side, a two-stage, synchronized splitter group, a multi-gear, claw-shifted main transmission with a reversing gear stage, and a two-stage, claw-shifted range group in drive connection downstream therefrom. The splitter group and the main transmission are of countershaft design, whereas the range group is a planetary structure. The electric machine is a permanently energized synchronous machine arranged on the transmission input side. It comprises a stator and rotor and is designed for relatively high rotational speeds, which are adapted to lower transmission input rotational speeds by means of the high-drive stage. The high-drive stage is in the form of a planetary gearset comprising a central sun gear, an outer ring gear and a planetary carrier. On the planetary carrier, a number of planetary gearwheels are mounted to rotate, these meshing with the ring gear and the sun gear between which they rotate. The sun gear is drive-connected to the rotor of the electric machine, whereas the planetary carrier is connected in a rotationally fixed manner to a transmission input shaft and can be drive-connected on the drive input side to an internal combustion engine by means of a starting or separator clutch. The ring gear is permanently fixed to a housing. Between the rotor of the electric machine and the transmission input shaft, by virtue of the high-drive stage, there is a rotational gear ratio such that the rotational speed of the electric machine, when the latter is operating as a motor, is stepped down to a slower speed at the transmission input. If the vehicle is in overdrive operation and if therefore the electric machine is being operated as a generator, then the transmission input rotational speed is stepped up to a higher value at the electric machine. The vehicle transmission also has an oil pump driven by a transmission output shaft, and this supplies lubricating and cooling oil both to the vehicle transmission and to the electric machine and the high-drive stage.

Furthermore, from DE 10 2014 209 056 A1 by the present applicant a hybrid drive assembly is known, which comprises a main transmission with a transmission input shaft and a transmission housing, an electric machine that comprises a stator and a rotor, which can be operated as a motor and a generator and which is arranged on the input side of the main transmission, and a planetary gearset arranged between the rotor and the transmission input shaft, wherein the transmission input shaft has a central oil bore and transverse bores for the supply of oil to the planetary gearset and the electric machine, wherein the planetary gearset and the electric machine are arranged in a hybrid housing, and wherein the hybrid housing is connected to the transmission housing of the main transmission by way of an oil return pipe.

A relatively small and fast-rotating electric machine in combination with a high-drive stage requires increased cooling to carry away the considerable amount of heat that they generate during operation. This can be achieved, for example, by surrounding the stator of the electric machine with a water jacket and in addition, as described in DE 10 2013, 211 225 A1, by supplying lubricating and cooling oil from an oil circuit of the vehicle transmission to the components of the electric machine. However, since only a small and limited fraction of the volume flow of lubricating and cooling oil from an oil pump can be diverted away from the transmission, until now the electric power of the electric machine once a certain temperature threshold has been exceeded is automatically throttled down in order to protect the electric machine and the components around it from overheating and possible damage. This so-termed "derating" of the electric machine can result in a significant temporary reduction of the available electric drive power or generator performance in the drive-train and thereby have an adverse effect on driving comfort and drive power. The incorporation of a larger oil pump, which would constantly deliver a larger volume flow of lubricating and cooling oil, does not seem very appropriate since that would result in higher drag losses in the transmission, it would take up more structural installation space, and it would increase manufacturing costs.

SUMMARY OF THE INVENTION

Against this background the purpose of the present invention is to describe a hybrid drive assembly for a motor vehicle, a motor vehicle equipped with it and a method whereby a cutback of the power of an electric machine in the drive-train can be avoided or at least delayed.

This objective is achieved by the characteristics specified, advantageous design features and further developments of the invention as described below.

The invention is based on the recognition that in a parallel hybrid drive-train of a motor vehicle a smaller electric machine can be used without disadvantage if its greater heat output due to higher rotational speeds can be counteracted by more effective cooling.

Accordingly, the invention starts with a hybrid drive assembly of a motor vehicle having a vehicle transmission and an electric machine arranged in an attachment module. In the attachment module the rotor of the electric machine rotates in a rotational space. The attachment module and the vehicle transmission share a common oil system. The oil temperature in the oil system is measured and thereby monitored.

To achieve the stated objective, the invention provides that in the hybrid drive assembly a device is provided which, if a predetermined limit value of the oil temperature is exceeded, influences and changes the level of oil in the oil sump in the rotational space of the electric machine. In this case the influence takes place in such manner that the rotor can be immersed in the oil in the oil sump. The rotor can be immersed in the oil when the level of oil in the oil sump rises compared with its extent otherwise.

During normal operation below the temperature limit, the effort is made not to allow the rotor to rotate in the oil within the oil sump, in order to avoid losses due to splashing the oil in the oil sump. The attachment module is then lubricated by dry sump lubrication by the oil brought in centrally by way of the driveshaft. In the situation of an elevated temperature, however, the rotor should be able to take up oil by immersion and throw it off as it rotates. The oil is transported by the rotor through the air gap between the rotor and the stator inwardly around the whole of the stator and flung out laterally onto the windings. In that way the dry sump lubrication is supplemented by immersion lubrication and this maximizes the amount of heat transported through the electric machine.

As soon as the temperature again falls below the temperature limit, the level of the oil in the oil sump in the rotational space is corrected again and the lubrication is changed back again to dry sump lubrication alone.

The invention can be applied to particularly good advantage by using an oil return pipe provided between the attachment module and the vehicle transmission, such that the device according to the invention opens or closes this oil return pipe. In this way the pipe that forms the connection between the attachment module and the transmission can be used to vary the available oil capacity and thereby influence the oil distribution.

If the oil in the rotational space of the electric machine's rotor rises above a maximum filling level, then in an advantageous version of the invention an overflow is provided, which connects the rotational space to the oil return pipe. The connection between the overflow and the oil return pipe is positioned such that it opens into the oil return pipe between the device according to the invention and the vehicle transmission. This ensures that the oil level in the rotational space cannot raise high enough to produce negative effects on the arrangement.

Advantageously, a control unit can be provided which is connected to the device. The control unit controls a valve in the device when the oil temperature limit value is exceeded, which valve then opens or closes the oil return pipe. This provides an effective way of reacting to the rising temperature and adapting the oil filling quantity quickly and appropriately.

In another, simpler and cheaper version the device comprises a thermostat, which opens or closes the oil return pipe. Such an embodiment can adapt the oil filling quantity as a function of the temperature without the need for an additional control unit. That also applies to a further advantageous design, in which the device comprises a temperature-dependent bimetallic system which opens or closes the oil return pipe. For this, a bimetallic strip can for example be connected to a closing cover of the oil return pipe, which changes its shape if the temperature limit is exceeded and brings the closing cover to a position where it closes off the oil return pipe.

The invention also includes a method of cooling an electric machine rotating in a rotational space, which is supplied with oil. The oil temperature is measured, and if an oil temperature limit value is exceeded, the oil level in the oil sump in the rotational space of the electric machine is influenced. This influencing takes place in such manner that the oil level in the oil sump in the rotational space rises so that the rotor in the oil sump can be immersed. The rotor can then take up oil and throw it off again onto the components of the electric machine.

As an advantageous design of the method, the draining of oil out of the oil sump is influenced so that the oil level rises in the rotational space of the electric machine. As described above, this influence can be exerted by the various closing mechanisms of the oil return pipe. In this way the oil level in the rotational space can be simply and effectively varied whereas the oil supply remains unchanged. In another advantageous embodiment, the oil flowing in is influenced in such manner that the oil flow into the rotational space of the electric machine is increased by increasing the oil volume flow if the temperature limit is exceeded. The delivery pump temporarily conveys more oil, so that the oil in the rotational space of the electric machine rises.

BRIEF DESCRIPTION OF THE DRAWINGS

The invention is explained in more detail with reference to drawings, which show:

FIG. 1: A schematic representation of a known hybrid assembly

FIG. 2: A known hybrid assembly with attachment module

FIG. 3: A device according to the invention below the temperature limit

FIG. 4: A device according to the invention above the temperature limit

DETAILED DESCRIPTION OF THE PREFERRED EMBODIMENTS

FIG. 1 shows a schematic representation of a hybrid drive assembly 2, which comprises a main transmission 4 and a hybrid module 6. The main transmission 4 has a transmission input shaft 8, a number of gear steps for forward gears and a gear step for a reverse gear R. The hybrid module comprises an electric machine 10 with a stator 12 and a rotor 14, as well as a planetary gearset 16, which is connected on the one hand to the rotor 14 and on the other hand to the transmission input shaft 8. The planetary gearset 16 comprises three parts, namely a sun gear 18, a web or planetary carrier 20 and a ring gear 22, which latter is supported on the housing. Thus, between the rotor 14 and the transmission input shaft 8 there acts a stationary gear ratio of the planetary gearset 16.

The transmission input shaft 8 is connected to an internal combustion engine (not shown) by way of a clutch 24. Thus, the hybrid assembly 2 is a parallel hybrid. Furthermore, the main transmission 4 has a transmission output shaft 26 which drives an oil pump 28 that supplies both the main transmission 4 and the hybrid module 6 with oil. The electric machine 10 is preferably in the form of a commercially available permanently energized synchronous machine and can be operated both as a motor and as a generator. The permanently energized synchronous machine (PSM) is preferably designed to have a relatively high rotational speed, in order to increase the power density and to reduce the use of expensive materials. Thus, the planetary gearset 16 acts as a step-down gear stage between the higher rotational speed of the rotor 14 and the lower rotational speed of the transmission input shaft 8.

FIG. 2 shows a hybrid housing 30 of the hybrid module 6, in which the electric machine 10 comprising the stator 12 and the rotor 14 is accommodated. The rotor rotates in the rotational space 31 of the hybrid module 6. Between the hybrid housing 30 and the stator 12 is arranged an annular cooling channel 32, through which there flows cooling medium from a cooling circuit (not shown) for the internal combustion engine of the motor vehicle. The cooling channel 32 is delimited on the outside by an outer wall 34, which is in this case part of the hybrid housing 30, and on the inside by a finned cooling mantle 36. Thus, the cooling channel 32 is delimited on its radially inner side by the cooling mantle 36 and on its radially outer side by the outer wall 34, the cooling mantle 36 being inserted into the hybrid housing 30 and sealed on both sides of the cooling channel 32. The oil supplied by way of the transmission input shaft (not shown here) passes into an oil sump in the lower part of the hybrid housing 30, wherein the oil sump has an oil chamber 40 arranged on the left in the drawing and an oil chamber 42 arranged on the right in the drawing—i.e. on both sides of the electric machine 10. In the drawing, under the electric machine 10 there is arranged an oil cooling space 44 which has an inlet opening 46 and an outlet opening 48 and is in flow connection with the two oil chambers 40, 42 of the oil sump. Onto the hybrid housing 30 is attached an oil return pipe 50. Thus, the oil return pipe 50 is in flow connection with the oil sump of the main transmission 4 (not shown here). As can be seen from the drawing, the oil return pipe 50 is arranged at approximately the same level as the outlet opening 48 of the oil cooling space 44, so that the oil flow to be returned can drain away without further flow diversions or obstacles, i.e. in a relatively loss-free manner, back into the oil sump of the main transmission 4.

FIG. 3 shows a section of the hybrid module 6. Oil flows past the rotor 14 and the stator 12 as indicated by the two oil-flow arrows 52 and 54, and after passing through the two oil chambers 40 and 42, flows into the oil return pipe 50. The oil level 56 of the main transmission 4, indicated by broken lines, and the oil level 58 of the hybrid module 6, also indicated by broken lines, are alike and are positioned at the same level. The rotational space 31 of the rotor 14 is connected to the oil return pipe 50 by way of an overflow 60. In front of the outlet opening 48 in the oil return pipe 50 is provided a closing flap 62 which is arranged on a thermostat 64. FIG. 3 shows the closing flap 62 in its open condition, so that oil can interchange between the oil levels 56 and 58.

FIG. 4 shows the same view of the hybrid module as FIG. 3. In FIG. 4, however, the closing flap 62 has now been displaced into its closed condition by the thermostat 64 to the extent that the outlet opening 48 is largely blocked. Depending on the design of the closing flap 62, at most only small oil flows 66 or 68 can still pass beyond the closing flap 62. Owing to this closing of the outlet opening 48, the oil level 58 in the hybrid module 6 rises, while the oil level 56 in the main transmission 4 remains very largely the same. Accordingly the rotor 14 can be immersed in the oil at the oil level 58 and, during rotation thereof, can take up and carry oil which it then distributes in the electric machine 10. The oil level 58 rises at most up to the overflow 60. The oil flow 70 can drain away into the oil return pipe 50 by way of the overflow 60.

INDEXES

2 Hybrid drive assembly
4 Main transmission
6 Hybrid module
8 Transmission input shaft
10 Electric machine
12 Stator
14 Rotor
16 Planetary gearset
18 Sun gear
20 Planetary carrier
22 Ring gear
24 Clutch
26 Transmission output shaft
28 Oil pump
30 Hybrid housing
32 Cooling channel
34 Outer wall
36 Cooling mantle
31 Rotational space
40 Oil chamber
42 Oil chamber
44 Oil cooling space
46 Inlet opening
48 Outlet opening
50 Oil return pipe
52 Oil arrow
54 Oil arrow
56 Oil level
58 Oil level
60 Overflow
62 Closing flap
64 Thermostat
66 Oil flow
68 Oil flow
70 Oil flow
R Reverse gear

The invention claimed is:

1. A hybrid drive assembly for a motor vehicle comprising:
   a main transmission (4);
   an electric machine (10) being arranged in a hybrid module (6);
   the electric machine having a rotor (14) that rotates within a rotational space (31);
   the hybrid module (6) and the main transmission (4) sharing a common oil system;
   a temperature of oil in the common oil system being measurable;
   an oil return pipe (50) extending between the hybrid module (6) and the main transmission (4) for permitting oil to flow from the hybrid module (6) to the main transmission (4);
   a device (62, 64), when a limit value of the temperature of the oil is exceeded, closing the oil return pipe (50) to increase a level of oil in the rotational space (31) of the electric machine (10) such that the rotor (14) of the electric machine becomes immersed in the oil, in the rotational space (31), and the rotor (14) takes up oil and throws the oil off to distribute the oil in the electric machine (10).

2. The hybrid drive assembly according to claim 1, wherein the device (62, 64) facilitates both opening and closing of the oil return pipe (50) that extends between the hybrid module (6) and the main transmission (4).

3. The hybrid drive assembly according to claim 2, wherein an overflow (60) fluidly connects the rotational space (31) to the main transmission (4).

4. The hybrid drive assembly according to claim 2, wherein a control unit is connected to the device and the control unit controls a valve of the device that either opens or closes the oil return pipe (50) based upon the temperature of the oil.

5. The hybrid drive assembly according to claim 2, wherein the device comprises a thermostat (64) which either opens or closes the oil return pipe (50).

6. The hybrid drive assembly according to claim 2, wherein the device comprises a temperature-dependent bimetallic device which either opens or closes the oil return pipe (50).

7. The hybrid drive assembly according to claim 2, wherein each of the hybrid module and the main transmission has a respective oil sump, the oil return pipe couples the oil sump of the hybrid module and the oil sump of the main transmission such that oil flows therebetween, the device, which influences an oil level in the rotational space, is a temperature sensitive control device which is arranged between the oil sump of the hybrid module and an inlet end of the oil return pipe, an overflow conduit couples the rotational space and a point of the oil return pipe spaced downstream from the inlet end thereof to facilitate oil flow from the rotational space into the oil sump of the main transmission,
  if the measured temperature of the oil is below the limit value of the temperature of the oil, the control device opens the oil return pipe so that the oil flows from the oil sump of the hybrid module, via the oil return pipe, toward the oil sump of the main transmission and the oil level in the rotational space oil is substantially equal to a level of the oil in the main transmission, and
  if the measured oil temperature is above the limit value of the temperature of the oil, the control device closes the oil return pipe so that the oil flow from the rotational space, via the overflow conduit and the oil return pipe, toward the oil sump of the main transmission is at least partially reduced and an oil level in the hybrid module becomes greater than an oil level in the main transmission.

8. A method for cooling an electric machine (10) rotating in a rotational space (31) with oil, the method comprising:
  measuring an oil temperature of the oil;
  providing a device for opening or closing an oil return pipe (50) which extends between the hybrid module (6) and the main transmission (4); and
  if the measured oil temperature exceeds an oil temperature limit value, adjusting an oil level (58) in the rotational space (31) of the electric machine (10) by closing that oil return pipe (50) so that a rotor (14) of the electric machine becomes immersed in the oil, located within the rotational space, and the rotor (14) takes up the oil and throws the oil off onto components of the electric machine (10) located within the rotational space.

9. The method according to claim 8, further comprising controlling drainage of the oil out of the rotational space, by closing the oil return pipe (50), such that the oil level in the rotational space (31) of the electric machine (10) rises.

10. The method according to claim 8, further comprising increasing an inflow of the oil into the rotational space (31) of the electric machine (10) so that the oil level in the rotational space (31) of the electric machine (10) rises.

11. A vehicle in combination with a hybrid drive assembly comprising:
  a main transmission (4);
  an electric machine (10) being arranged in a hybrid module (6);
  the electric machine having a rotor (14) for rotating within a rotational space (31);
  the hybrid module (6) and the main transmission (4) sharing a common oil system;
  an oil return pipe being located between the hybrid module and the main transmission;
  a temperature of oil in the common oil system being measurable; and
  a device (62, 64) influencing a level of oil in the rotational space (31) of the electric machine (10) so that, if a limit value of the temperature of the oil is exceeded, the device closing the oil return pipe so that the rotor (14) becomes partially immersed in the oil, within the rotational space, and takes up oil and throws the oil off onto components of the electric machine (10) located within the rotational space.

* * * * *